United States Patent [19]

Leining et al.

[11] Patent Number: 4,525,896
[45] Date of Patent: Jul. 2, 1985

[54] PORK SHOULDER OR HAM SLASHER APPARATUS

[75] Inventors: Lyndon R. Leining; Rodger W. Bliese; Gordon G. White, all of Austin, Minn.

[73] Assignee: Geo. A. Hormel & Company, Austin, Minn.

[21] Appl. No.: 512,889

[22] Filed: Jul. 11, 1983

[51] Int. Cl.[3] .............................................. A22C 9/00
[52] U.S. Cl. ........................................ 17/1 R; 17/26; 83/433
[58] Field of Search ............................. 17/25, 26, 1 R; 83/404.4, 407, 425.2, 433, 435.2, 482; 99/485

[56] References Cited

U.S. PATENT DOCUMENTS

| | | | |
|---|---|---|---|
| 3,075,236 | 1/1963 | Mann et al. | 83/435.2 X |
| 3,222,713 | 12/1965 | Stein et al. | 17/26 |
| 3,900,919 | 8/1975 | Lekan et al. | 17/26 |
| 4,147,081 | 4/1979 | Pellaton | 83/435.2 X |
| 4,259,886 | 4/1981 | Seid et al. | 83/425.2 |
| 4,263,827 | 4/1981 | Pontarollo | 83/482 |
| 4,384,501 | 5/1983 | Erikson | 83/425.2 |

Primary Examiner—Willie G. Abercrombie
Attorney, Agent, or Firm—Herman H. Bains

[57] ABSTRACT

An apparatus for slashing meat includes a support frame having a conveyor mounted thereon and comprised of endless conveyor elements arranged in side-by-side relation. Upper and lower blade assemblies are mounted on the support frame, and each is comprised of a plurality of independently mounted driven blades arranged in overlapping relation. Cuts of meat are moved by the conveyors and are simultaneously slashed through the upper and lower surfaces thereof by the upper and lower blade assemblies, which permit ready visual determination of the presence of abscesses and other defects in the meat, and also permits easy removal of the meat from the bone.

18 Claims, 15 Drawing Figures

PORK SHOULDER OR HAM SLASHER APPARATUS

SUMMARY OF THE INVENTION

This invention relates to an apparatus for slashing meat.

In the meat processing field, various kinds of apparatus are used to separate meat from bone. It is also necessary to remove defective meat, such as those cuts which contain abscesses, from the processing operations that are used to make meat products for human consumption. In larger cuts of meat, such as picnic hams and the like, it is difficult to determine the presence of abscesses in the meat before the cut of meat is subjected to the deboning operation. One cannot detect a deep-seated abscess by mere visual inspection. However, in a high production operation, it is desirable to make a quick determination of the presence of an abscess prior to the deboning procedure.

It is therefore a general object of this invention to provide an apparatus for slashing meat, such as picnic hams and the like, which permits ready visual determination of the presence of abscesses and other defects in the meat.

Another object of this invention is to provide a meat slashing apparatus which cuts the tendons and gristle of the meat cuts, such as picnic hams and the like, to thereby permit easier removal of the meat from the bone.

These and other objects and advantages of the invention will appear more fully from the following description made in conjunction with the accompanying drawings wherein like reference characters refer to the same or similar parts throughout the several views.

DESCRIPTION OF THE PREFERRED EMBODIMENT

Figure 1:
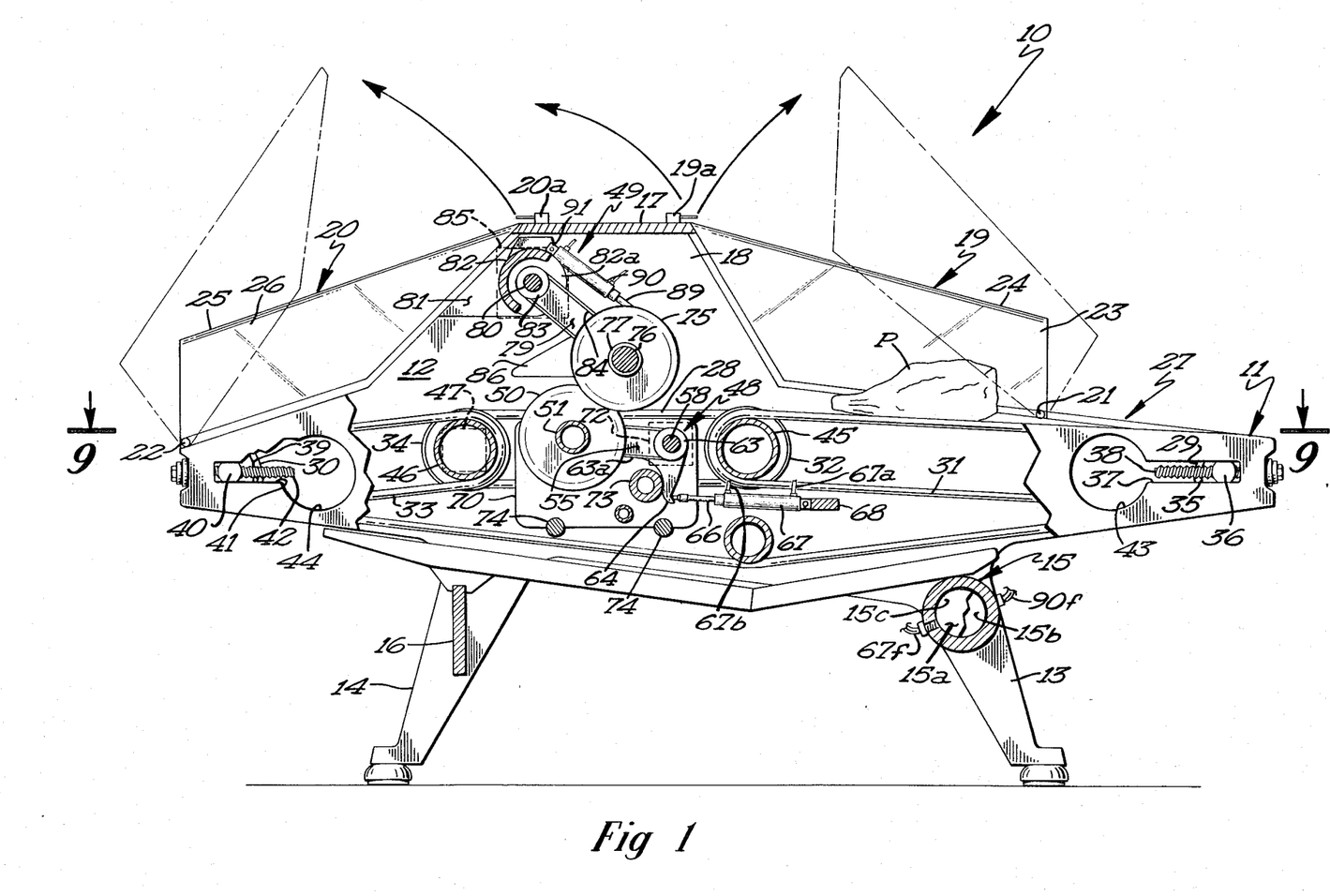
FIG. 1 is a side elevational view of the novel apparatus for slashing meat, with certain parts thereof broken away for clarity.

Referring now to the drawings, and more specifically to FIG. 1, it will be seen that one embodiment of the apparatus for slashing meat, designated generally by the reference numeral 10, is thereshown. The apparatus 10 includes a support frame 11, which is comprised of a pair of similar side plates 12, each having a front leg 13 and a rear leg 14. An elongate, hollow, tubular structure 15 extends between and is rigidly connected to the respective front legs. The hollow tubular structure 15 has a transverse wall 15a extending therethrough to form the interior of the tubular structure 15 into a chamber 15b and a chamber 15c. An elongate vertical plate 16 extends between and is rigidly connected to the rear legs 14 of the side frame plates. A substantially flat, elongate upper plate 17 extends between and is rigidly connected to the side frame plates 12, intermediate the ends thereof. In this regard, it will be noted that each of the side frame plates 12 has a central portion 18 which extends upwardly beyond the remaining portions of each side frame plate. The upper plate 17 extends between and is rigidly connected to the upwardly projecting central portions of each side frame plate.

The support frame is also provided with a front shield 19 and a rear shield 20, each being pivotally connected to the support frame 11. Each of the shields is formed of a transparent polycarbonate material, and the front shield 19 is pivoted on the support frame 11 by pivots 21. The rear shield 20 is pivotally connected to the support frame 11 by pivot 22. It will be seen that the front shield 19 is comprised of a pair of side elements 23 which are integral with a top shield element 24. The front shield and rear shield may be swung between a closed position, as illustrated in full line configuration in FIG. 1, to an open or inoperative position, as illustrated by dotted line configuration. The shields cooperate with the support frame 11 to define a housing which contains all the components of the ham slashing apparatus. A pair of safety valves 19a and 20a are mounted on the top adjacent the front and rear edges thereof. When the front shield 19 is moved to a raised, open position, it will actuate a safety valve 19a which stops operation of the apparatus. Similarly, when the rear shield 20 is moved to the raised, open position, it will actuate a safety valve 20a which also stops operation of the apparatus.

Figures 4, 5, 7:
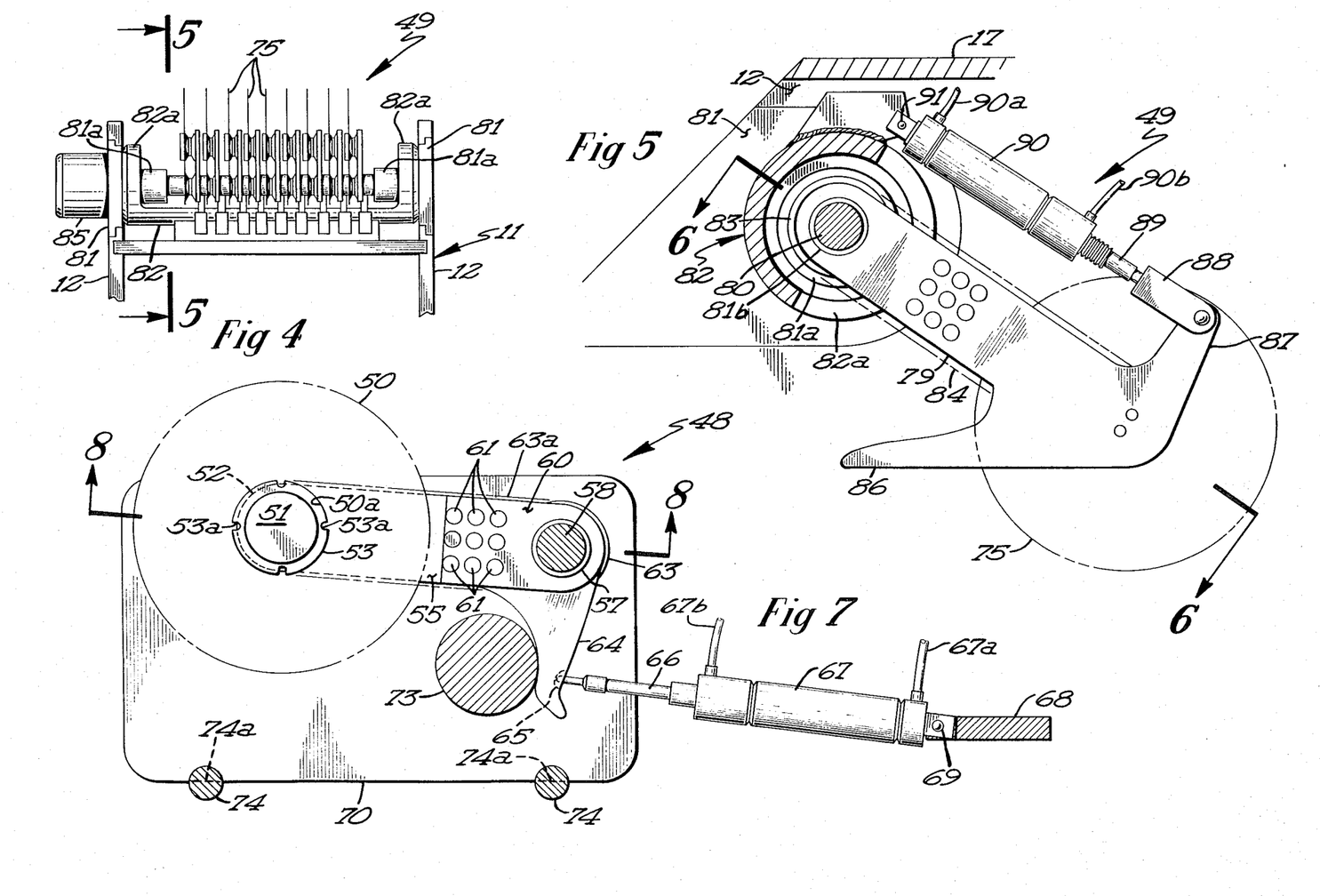
FIG. 4 is a cross-sectional view taken approximately along line 4—4 of FIG. 2 and looking in the direction of the arrows.
FIG. 5 is a cross-sectional view taken approximately along line 5—5 of FIG. 4 and looking in the direction of the arrows.
FIG. 7 is a cross-sectional view through the lower blade assembly illustrating details of construction thereof.

The picnic hams to be slashed are moved through the interior or housing by a conveyor device 27. Referring now to FIGS. 1 and 5, it will be seen that the conveyor device 27 is comprised of a plurality of endless conveyor belt elements arranged in side-by-side relation.

The endless conveyor belt elements include a plurality of long endless belt elements 28 which extend from the front end of the support frame to the rear end portion thereof. The long conveyor elements 28 are trained about a multi-sheaved pulley 29 located at the front end portion of the frame, and a multi-sheaved pulley 30 located at the rear end portion of the frame.

The long endless belt elements 28 are arranged in side-by-side relation, but are spaced apart sufficiently to permit a plurality of short endless belt elements 31 to be arranged in alternate relation therewith. In the embodiment shown, the short endless belt elements 31 are trained about the multi-sheaved pulley 29 and about a multi-sheaved pulley 32, located adjacent the mid-portion of the support frame. Each short endless belt element 31 is positioned between a pair of the long endless belt elements 28.

Figures 2, 9:
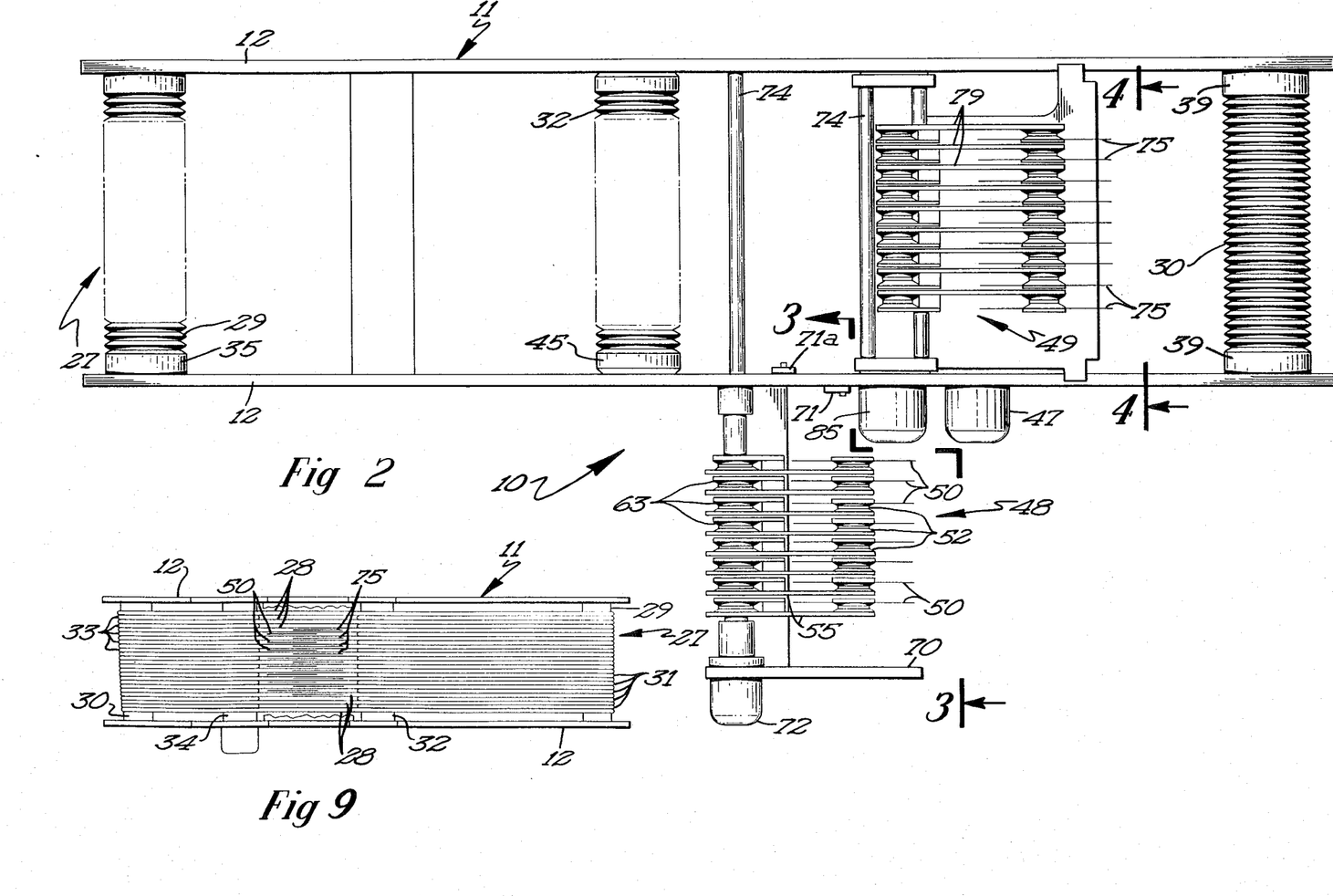
FIG. 2 is a bottom plan view of the apparatus.
FIG. 9 is a cross-sectional view taken approximately along line 9—9 of FIG. 1 and looking in the direction of the arrows.

The conveyor device 27 also includes a second group of short endless belt elements 33 which are trained about the multi-sheaved pulley 30 and about a multi-sheaved pulley 34 which is spaced from and located downstream of the multi-sheaved pulley 32. It will be noted that the short belt elements 33 are each positioned between a pair of the long endless belt elements 28. With this arrangement, it will be seen that the belt elements present a substantial continuous surface adjacent the major length of the conveyor device, but that the long belt elements 28 provide the only support for the picnic hams adjacent the mid-portion of the support frame. The long belt elements 28 are therefore spaced apart in this mid-portion zone, as best seen in FIG. 9, to accommodate the slashing blades.

The multi-sheaved pulley 29 is supported on a pair of stub shafts 35, each having a nut 36 secured thereto and projecting into a slot 37 formed in the associated side frame plate 12 adjacent the front end thereof. Each nut is threadedly engaged by a threaded rod 38 which projects beyond the end of the associated side plate. It will be seen that by rotating the rods 38, the multi-sheaved pulley 29 can thereby tighten or loosen the long belt elements 28 and short belt elements 31.

The multi-sheaved pulley 30 is also provided with stub shafts 39, each of which is secured to a nut 40 positioned in a slot 41 formed in the associated side plate adjacent the rear end portion of the frame. Each nut 40 is threadedly engaged by threaded rod 42 for tightening and loosening the long belt elements 28 and the short belt elements 33. It also will be noted that the side plates 12 have openings 43 located therein adjacent the forward end portion of the frame, and openings 44 therein adjacent the rear end portions of the frame. The openings 43 are disposed in aligned relation as are the openings 44. This arrangement permits the multi-sheaved pulleys and belts to be removed and repaired.

The multi-sheaved pulley 32 is journaled on a sleeve 45 which is mounted in the side frame plates 12. The multi-sheaved pulley 34 is also journaled on a sleeve 46 which is mounted on the side plates 12. Means are also provided for revolving the pulley 34 and thereby moving all of the conveyor belt elements in a direction so that the respective upper runs of these conveyor elements move from the front to the rear. This means includes a hydraulic motor 47 which is connected with the multi-sheaved pulley 34 and revolves the pulley in a counter-clockwise direction, as viewed in FIG. 1.

Means are provided for simultaneously slashing the upper and lower portions of a picnic ham as it is moved by the conveyor device from the front end of the ham slashing apparatus to the rear end thereof. This slashing means includes a lower blade assembly 48 and an upper blade assembly 49.

Figures 3, 6, 8:
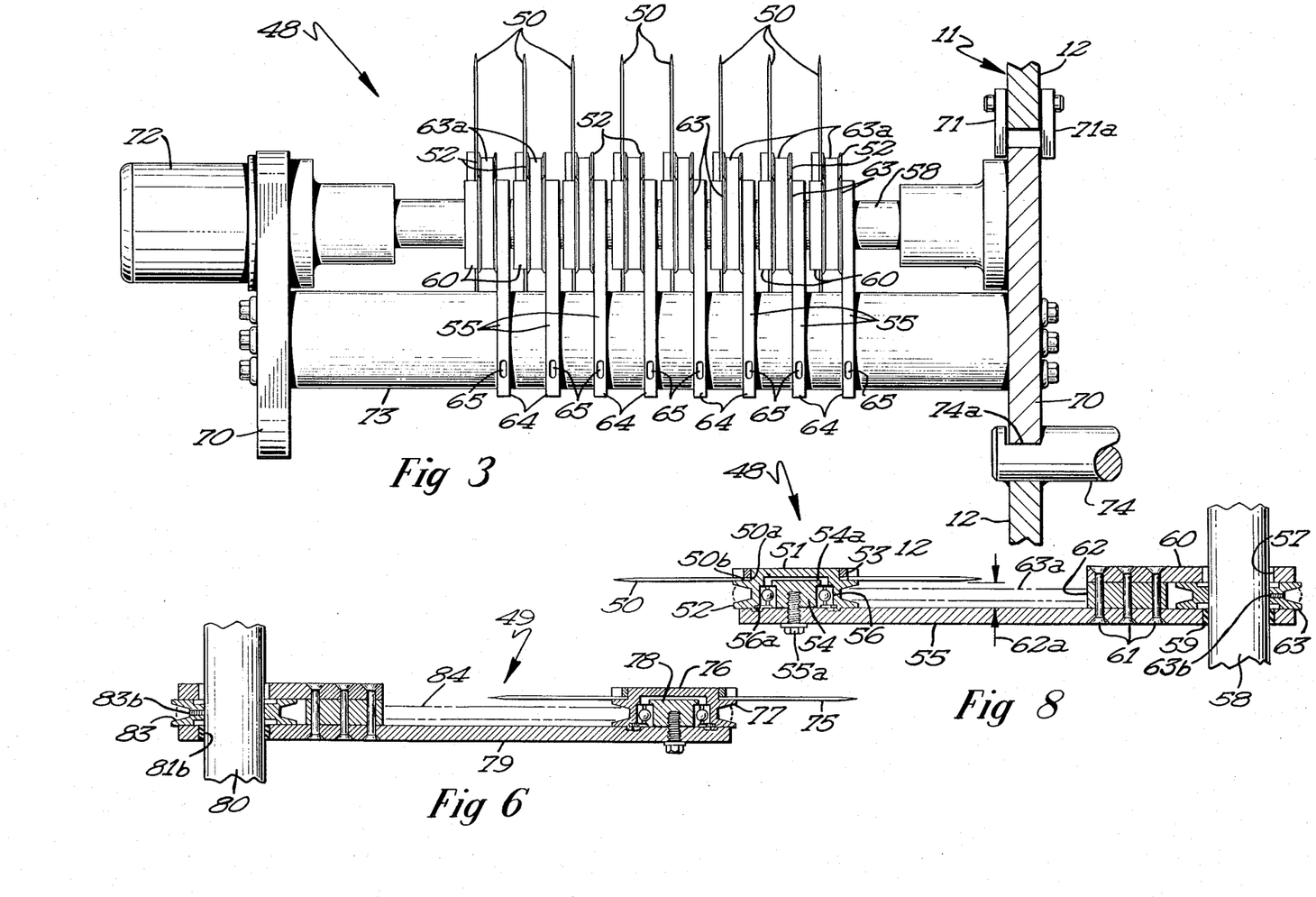
FIG. 3 is a sectional view taken approximately along line 3—3 of FIG. 2 and looking in the direction of the arrows, with the lower set of slashing knives illustrated in an inoperative position.
FIG. 6 is a cross-sectional view taken approximately along line 6—6 of FIG. 5 and looking in the direction of the arrows.
FIG. 8 is a cross-sectional view taken approximately along line 8—8 of FIG. 7 and looking in the direction of the arrows.

Referring now to FIGS. 3 and 8, it will be seen that the lower blade assembly 48 includes a plurality of circular rotary blades 50, each being mounted on the pulley hub 51 of a pulley 52 by a nut 53. It will be seen that each blade 50 has an opening 50a therein accommodating the pulley hub therethrough. The nut 53 has a plurality of grooves 53a therein which accommodate a special wrench. Each pulley 52 is mounted on a circular mounting block 54 which is secured to one end portion of an elongate arm 55 by a bolt 55a. A bearing 56 is interposed between the inner surface of the pulley 52 and the exterior surface of the mounting block 54 to journal the pulley and blade 50 on the mounting block. In this regard, the mounting block has an outwardly projecting flange 54a which engages the edge of the ball bearing race, the bearing being secured to the pulley by a snap ring 56a.

The other end of the arm 55 is provided with an opening 57 through which a shaft 58 projects. A bearing 59 is interposed between the shaft 58 and the opening in the arm 55. Each support arm 55 is also provided with a mounting plate 60 which is secured to the arm by rivets 61. It will be noted that a spacer element 62 is disposed between the mounting plate 60 and the arm 55 to define a space 62a therebetween. A pulley 63 is secured to the shaft 58 by a set screw 63b and is positioned in the space 62a. The pulley 63 is disposed in aligned relation with the pulley 52, and an endless belt 63a is trained about pulley 52 the pulley 63. It will therefore be seen that when the shaft 58 is rotated, each pulley 63 will also be rotated and will accordingly rotate the associated pulley 52 and the blade 50. With this arrangement, each blade and its associated arm 55 are individually driven from the shaft 58 and each arm 55 is swingable relative to the shaft 58 to thereby permit cutting of a picnic ham, but accommodating unevenness in the surface configuration of a picnic ham.

Referring again to FIG. 7, it will be seen that each arm 55 has a downwardly extending portion 64 which gives the arm the configuration of a bell crank. The crank portion 64 for each arm has a recess 65 therein that accommodates the rounded end of a piston rod 66 which is movable in and out of a double acting pneumatic cylinder 67. The end of each pneumatic cylinder 67 is mounted on a bar 68 by suitable attachment tabs 69 which are secured in place by suitable bolts. The mounting bar 68 is secured to the side frame plates, as best seen in FIG. 1. With this arrangement, downward movement of each blade and associated arm 55 will be yieldably resisted by the pneumatic piston and cylinder unit 66 and 67. The blade and associated crank arm will be normally urged to the position illustrated by full line configuration in FIG. 1.

Figure 15:
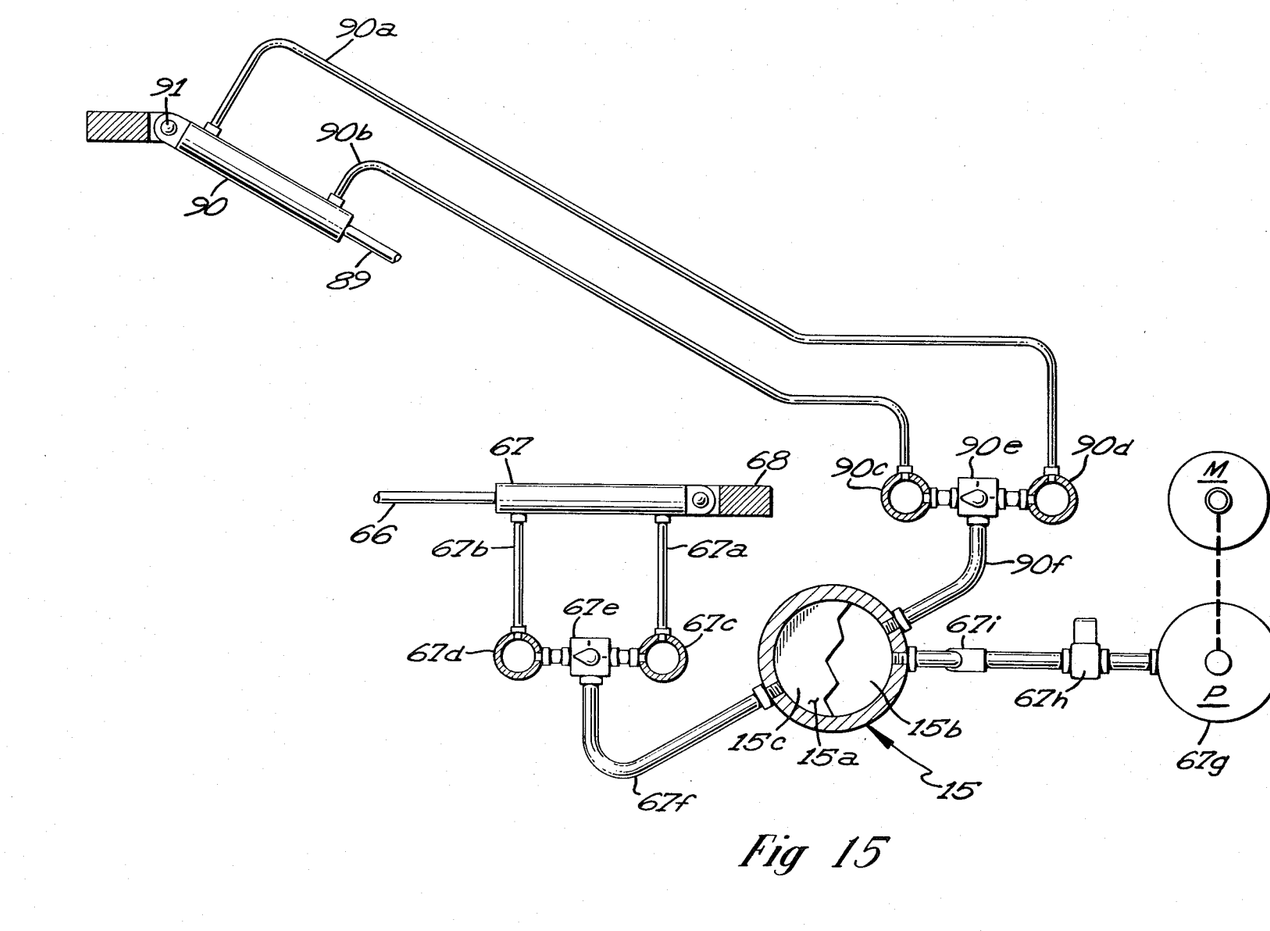
FIG. 15 is a diagrammatic view of the pneumatic circuit for the pneumatic cylinders of the upper and lower blade assemblies.

Referring now to FIG. 15, it will be seen that each cylinder 67 is connected by a conduit 67a to a manifold 67c and each cylinder 67 is connected by a conduit 67b to a manifold 67d. It will also be seen that manifold 67c and manifold 67d are connected by suitable fittings to a two-way electrically operated valve 67e. The switch for the valve 67e may be manually actuated, and is operable to simultaneously cause all the piston rods 66 to retract or be extended.

The valve 67e is connected by a conduit 67f to the chamber 15b. Air under pressure is supplied to the chamber 15b and to the chamber 15c by a pump 67g which is connected on its output side to a pressure regulator 67h. The pressure regulator is also connected to a tee fitting which is connected in turn to a pair of conduits 67i which serve to intercommunicate the pump 67g with the chambers 15b and 15c, respectively.

When the valve 67e is actuated, all of the piston rods 66 may be simultaneously retracted or extended. The piston rods 66 are retracted when it is desirable to remove the lower blade assembly from its position within the housing of the apparatus for the purpose of cleaning or repair. It is pointed out that each blade 50 and each crank arm 64 will be normally urged to the position illustrated in FIG. 1.

Referring again to FIGS. 1 and 3, it will be seen that the shaft 58 extends between and is journaled on a pair of mounting side plates 70, which are normally mounted on the side frame plates 12 by latches 71 and 71a. A hydraulic rotary motor 72 is also mounted exteriorly on one of the side plates 70 and drivingly engages the shaft 58 for rotating the same. A tubular stop member 73 extends between and is secured to the side mounting plates 70 and serves to limit the movement of the crank portion 64 of the mounting arms 55 in a clockwise direction.

When it is desirable to move the entire lower blade assembly laterally from within the interior of the support frame 11, all of the piston rods 66 will be simultaneously retracted by actuation of the valve 67e. In the embodiment shown, the valve 67e is electrically operated and may be controlled by an electrical switch. A latch 71 which is mounted on one of the side frame plates 12 of the support frame 11 will be pivoted to an unlocked position and the side plates 70 will slide along the surface of the rods 74. The latch 71a will also be pivoted to an unlocked position and the entire lower plate assembly will be moved until one of the side plates 70 is positioned flush or in registery with the side frame plates 12 of the main frame, as best seen in FIG. 3. When this side plate reaches this position, it will fall into notches 74a in the outer end portions of the rods 74. The latches 71 and 71a will be pivoted to the locked position and the entire blade assembly will be supported in cantilevered fashion in the position illustrated in FIG. 3. The blades may then be cleaned or repaired as desired.

When it is desirable to move the lower blade assembly back into its original position, the latches 71 and 71a will be shifted to an unlocked position and the side plates 70 will be lifted from the slots in the rods 74 and the entire assembly will slide along the rods 74 until the lower blade assembly is again positioned in its original operative condition. The latches 71 and 71a will be pivoted to the locked position. The piston rods 66 may then be extended to again position the ends of the piston rods in the recesses 65 on the crank arms of the lower blade assembly.

The lower blade assembly is mounted on the support frame 11 so that the blades thereof project upwardly between a pair of adjacent long belt elements 28 of the conveyor device 27. With this arrangement, the lower blades serve to cut deeply into the picnic ham as it is moved through the interior of the slashing apparatus by the conveyor device 27.

Referring again to FIGS. 1, 5 and 6, it will be seen that the upper blade assembly 49 also includes a plurality of similar circular blades 75, each being mounted on a pulley hub 76 of a pulley 77 in the same manner as the blade and pulley arrangement of the lower blade assembly. The circular blades are therefore mounted on the pulley hub by a nut having grooves therein which accommodate a special wrench to tighten the nut. The pulley 77 is journaled on a mounting block 78 which is secured to an elongate arm 79 by a bolt, in the manner of the lower blade assembly.

The other end of each elongate arm 79 is journaled on a shaft 80 which in turn is journaled in suitable bearings 81a carried by mounting plates 81 which are secured to the side frame plates 12. An elongate, trough-shaped mounting member 82, having annular ends 82a, extends between and is journaled on bearings 81a carried by the mounting plates 81. The trough-shaped mounting member 82 is journaled or revolvable about the bearings 81a between an operative position and an inoperative position. Each arm 79 has a pulley 83 associated therewith in the manner of the lower blade assembly, and each pulley 83 is secured to the shaft 80 by a set screw 83b. Each pulley 83 has a belt 84 trained thereover, and the belt 84 is also trained about the associated pulley 77. A rotary hydraulic motor 85 is mounted on the exterior surface of the mounting plates 81 and is drivingly connected to the shaft 80 whereby when the motor is energized, the shaft will be rotated thereby rotating the pulleys 83. When this occurs, the pulleys 77 will also be driven, thereby rotating the associated blades 75.

Each arm 79 also has a hold-down shoe portion 86 integrally formed with the lower end thereof and projecting generally horizontally and rearwardly thereof. The hold-down shoe portion 86 serves to engage the surface of the picnic ham as the latter is moved through the apparatus to assure effective cutting and slashing of the ham. Each arm 79 is also provided with a generally upwardly projecting crank arm 87 integral with the lower end portion thereof, and each crank arm is connected to a clevis 88 of a piston rod 89. The piston rod 89 is secured to a piston which is movable in a pneumatic cylinder. Each of the pneumatic cylinders 90 are secured to one of a plurality of tabs 91 on the trough-shaped mounting member 82.

Referring again to FIG. 15, it will be seen that each of the pneumatic cylinders 90 is connected by a conduit 90a to a manifold 90c and that each cylinder is connected by a conduit 90b to a manifold 90d. The manifolds 90c and 90d are connected to a two-way pneumatically operated valve 90e. The valve 90e is connected by a conduit 90f through the chamber 15c. It will be seen that the piston rod 89 may be extended and retracted by actuating the switch for the valve 90e. It is also pointed out that the use of pneumatic cylinders to urge the blades of the upper and lower blade assemblies into their normal operative position also permits rapid movement of these blades up and down when they hit bones in the meat being slashed. This rapid movement is desirable for the effective operation of the apparatus.

The pneumatic cylinder units serve to yieldably urge the associated arms 79 and the associated blades 75 in a downward direction when the upper blade assembly is in the operative position. However, the entire upper blade assembly may be swung upwardly and rearwardly to an inoperative position when it is desirable to clean or repair the blade assembly. This is done by rotating the trough-shaped mounting member 82, the arms 79 and cylinders 90 as a unit in a counter-clockwise direction, as viewed in FIG. 1. A suitable latch device 91 retains the trough-shaped mounting member in its operative position.

In operation, picnic hams P will be placed upon the conveyor device 27 and will be moved from the front end portion of the machine in a rearward direction. When the lower blade assembly is in the operative position, the rotary blades 50 project through the openings defined between adjacent of the long belt elements 28. In this regard, it will be seen that a substantial portion of the lower blades projects upwardly beyond the upper surface of the long conveyor elements 28. The circular blades 75 of the upper blade assembly will be positioned between adjacent of the lower blades 50 in interdigitating relationship. In the embodiment shown, the upper blades will be located approximately midway between the edges of the long belt elements.

The revolving rotary blades of the upper and lower blade assemblies will simultaneously slash the upper and lower surfaces of the picnic ham beyond the mid-point portion between the upper and lower surfaces of the picnic ham. Again it will be noted that the arcs of rotation of the upper and lower blades overlap, as best seen in FIG. 1. These blades slash through the upper and lower surfaces of the picnic ham beyond the mid-portion of the thickest part of the picnic ham. When a slashed ham is discharged, an inspector may quickly examine the ham to determine the presence of any deep abscesses that may be located therein. If an abscess is found, the picnic ham may be discarded, but if the picnic ham is acceptable it is immediately moved to the deboning station where the deboning apparatus removes the meat from the bone. It is pointed out that the ham slashing apparatus not only permits effective inspection to determine the presence of deep-seated abscesses and the like, but the slashing action of the blades cuts the tendons, bone and gristle to effectively improve the condition of the meat for the deboning operation.

Figures 10, 11, 12, 13, 14:
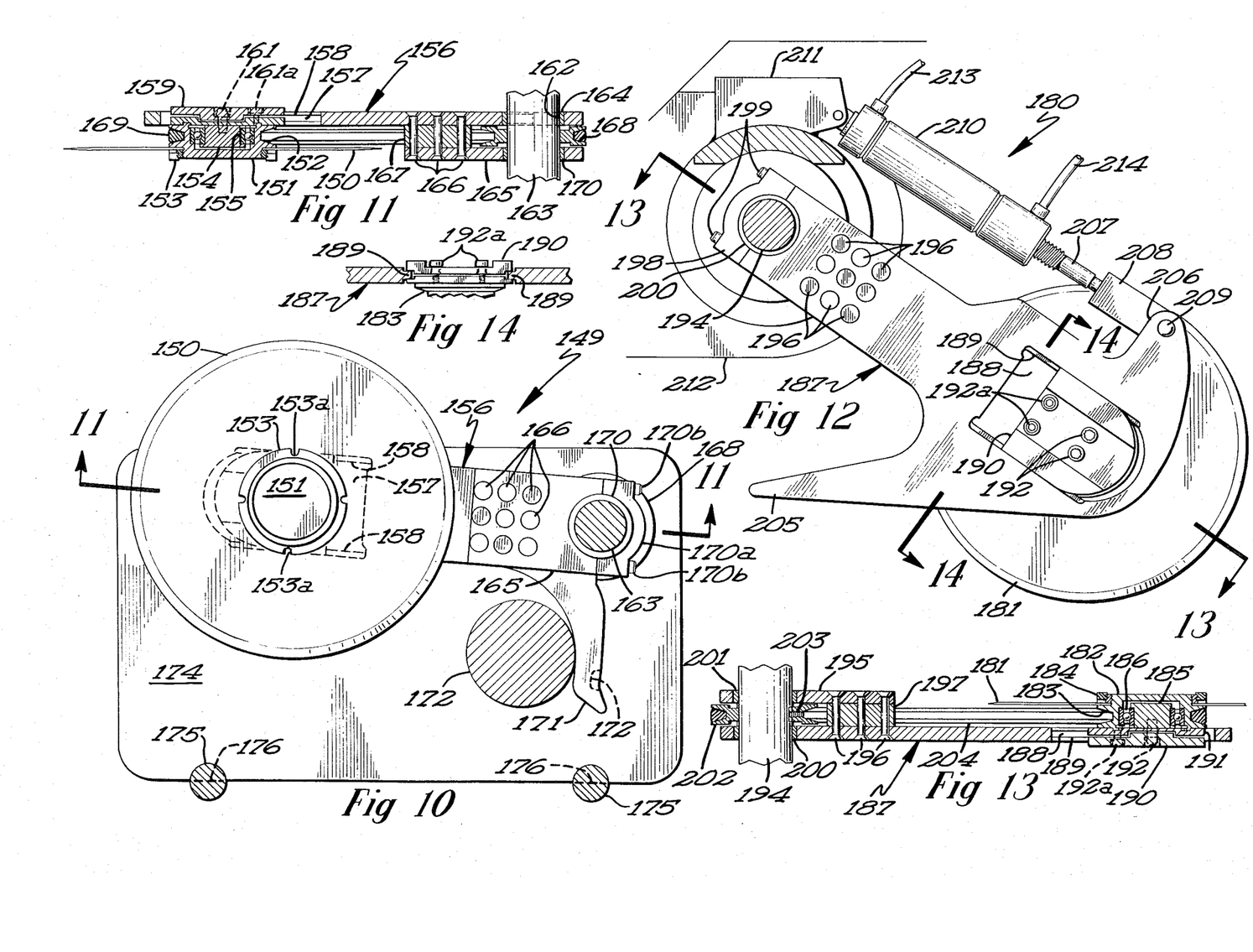
FIG. 10 is a cross-sectional view similar to FIG. 7, but illustrating a modified form of the lower blade assembly.
FIG. 11 is a cross-sectional view taken approximately along line 11—11 of FIG. 10 and looking in the direction of the arrows.
FIG. 12 is a cross-sectional view similar to FIG. 5, but illustrating a modified form of the upper blade assembly.
FIG. 13 is a cross-sectional view taken approximately along line 13—13 of FIG. 12 and looking in the direction of the arrows.
FIG. 14 is a cross-sectional view taken approximately along line 14—14 of FIG. 12 and looking in the direction of the arrows.

Referring now to FIGS. 10 through 12, it will be seen that a modified form of the lower blade assembly, designated generally by the reference numeral 148, is there-shown. It is pointed out that the modifications to the lower blade assembly 148 illustrated in FIGS. 10, 11 and 12 are only slight and permit the pulley belt to be adjustably tightened. Thus the lower blade assembly 148 includes a plurality of circular rotary blades 150, each being mounted on the pulley hub 151 of a pulley 152 by a nut 153. Each blade 150 has a centrally located opening 150a therein through which the hub 151 projects. The nut 153 is provided with a plurality of grooves 153a therein for accommodating a special wrench. The pulley 152 is journaled for rotation on a circular or cylindrical mounting block 154. A ball bearing assembly 155 is disposed between the mounting block 154 and the pulley 152 to permit rotation of the pulley and the associated blade 150. The pulley, mounting block and blade are slidably mounted in a generally rectangular shaped opening 157 located adjacent one end of an elongate arm 156.

The recess 157 in the elongate arm 156 is provided with upper and lower tongues 158. An outer clamping plate 159 is secured to an inner clamping plate 160 and to the mounting block 154 by a bolt 161. It is pointed out that the outer plate 159 has upper and lower recesses in its upper and lower edges, and the inner plate 160 has upper and lower recesses in its respective upper and lower edges. These recesses engage the tongues 158 and bolt 161 clamps the inner and outer clamping plates together on the tongues and to the mounting block 154. It will be seen that the bolt 161 may be loosened to permit the entire pulley and blade mechanism to be slid along the tongues 158 to adjust this mechanism longitudinally of the arm 156.

The other end of the arm 156 has an opening 162 therein through which a shaft 163 projects. A bearing 164 is disposed between the shaft 163 and the opening in the arm 156. Each support arm is also provided with a mounting plate 165 which is secured to the arm by rivets 166. A spacer element 167 is disposed between the mounting plate and the arm to define a space therebetween. A pulley 168 is journaled on the shaft 163 and is positioned in the space between the arm 156 and the mounting plate 165. An endless belt 169 is trained about the pulley 168 and the pulley 152. A bearing 170 is interposed between the plate 165 and the shaft 163. Rotation of the pulley 168 rotates the pulley 152. It will be seen that by adjusting the position of the pulley and blade mechanism in the slot 157, the tension on the belt 169 may be readily adjusted. A bearing cap 170a is secured to the mounting plate 165 by bolts 170b.

Referring again to FIG. 10, it will be seen that the arm 156 has a downwardly extending crank portion 171 which is normally urged into engaging relation with a stop member 172 by a pneumatic piston and cylinder unit (not shown) which engages a recess 173 in the identical manner as the pneumatic cylinder and piston unit illustrated in the embodiment in FIG. 7. Each of these cylinders is also connected by a conduit to the associated air chamber in the same manner of the lower blade assembly of the embodiment of FIGS. 1 through 9. In this regard, the shaft 163 is also journaled in a pair of mounting side plates 174 which are mounted on the side frames by suitable latches. The side plates are provided with slots 175 and are slidably mounted on a pair of support rods 176, and otherwise operate in identical manner as the embodiment of FIG. 7.

Referring now to FIG. 12, it will be seen that the modified form of the upper blade assembly 180 is also substantially identical to the upper blade assembly illustrated in FIGS. 5 and 6, but is provided with the belt-tightening feature in the manner of the lower blade assembly of FIGS. 10 through 12. The upper blade assembly 180 also includes a plurality of similar blades 181, each being mounted on a pulley hub 182 of a pulley 183. The circular blades are also mounted on the pulley hub by a nut 184 having grooves therein which accommodate a special wrench to tighten the nut. The pulley is journaled on a mounting block 185 by ball bearing assembly 186. The blade and pulley assembly are mounted on an elongate arm 187 in the manner of the lower blade assembly 148. The elongate arm also has a generally rectangular shaped opening 188 therein, and the opening defines upper and lower tongues 189 against which are clamped an outer plate 190 and an inner plate 191. The plates are secured together by a bolt 192 which also secures the plates to the circular mounting block 185. It will therefore be seen that when the bolt 192 is loosened, the entire blade and pulley assembly may be shifted in a longitudinal direction relative to the arm 187.

The other end of the elongate arm 187 has an opening 193 therein through which a shaft 194 projects. A mounting plate 195 is secured to the arm by rivets 196, and a suitable spacer 197 is interposed between the mounting plate and the arm. The mounting plate has a recess therein against which a bearing cap 198 is secured by suitable bolts 199. Suitable bearings 200 and 201 journal the arm 187 and the mounting plate 185, respectively, on the shaft 194. A pulley 202 is also mounted on the shaft 194 by a set screw 203. The pulley is revolvable with the shaft and is disposed between the arm 187 and the mounting plate 195. A belt 204 is trained about the pulley 202 and the pulley 183 whereby when the shaft 194 is revolved, the blade 181 will also be revolved. It will be seen that by adjusting the position of the blade and pulley device longitudinally of each arm 187, the tension on the belt 204 may be readily adjusted.

Each arm 187 also has a lower elongate hold-down shoe portion 205 which projects rearwardly therefrom. The hold-down shoe portion 205 functions in the same manner as the hold-down shoe portion 86 in the previously described embodiment of the upper arm assembly. Each arm 187 is also provided with a generally upwardly projecting crank arm 206 secured to the clevis 208 of a piston rod 207 by a pin 209. The piston rod is connected to a piston which is movable in a double acting pneumatic cylinder 210. Each of the pneumatic cylinders 210 is also secured to one of a plurality of tabs 211 mounted on a trough-shaped member 212. The pneumatic cylinder is connected by a pair of conduits 213 to a source of air under pressure. Although not shown, the conduits 213 are connected to the air collector or chamber in the manner of the previously described embodiment. It is pointed out that the upper blade assembly is substantially similar in construction and operation to the upper blade assembly of the previously described embodiment, but is provided with the belt-tightening feature.

From the foregoing description, it will be seen that we have provided a novel ham slashing apparatus, which is not only of simple and inexpensive construction, but one which functions in a manner to permit effective inspection of meat cuts to determine the presence of abscesses and also renders the meat in a more desirable condition for deboning.

While the preferred embodiments of the present invention have been described, it should be understood that various changes, adaptions and modifications may be made therein without departing from the spirit of the invention and the scope of the appended claims.

What is claimed is:

1. Apparatus for slashing cuts of meat containing bones, such as hams, shoulders and the like, prior to the removal of the bones from the cuts, comprising:
   a frame having an inlet and an outlet;
   conveyor means on said frame for supporting and moving cuts of meat from said inlet to said outlet, said conveyor means including a plurality of horizontally disposed endless conveyor elements arranged in side-by-side relation and defining a continuous horizontal support surface, the cuts of meat being horizontally supported on and moved by a plurality of the conveyor elements when moved from the inlet to the outlet;
   a plurality of similar revolvable upper blades, means mounting each upper blade on the frame for vertical movement independently of the other upper blades;
   a plurality of similar revolvable lower blades, means mounting each lower blade on the frame for vertical movement independently of the other lower blades, each lower blade having an edge portion projecting between a pair of upper blades in overlapping relation therewith;
   power means, means for drivingly connecting said upper and lower blades with said power means for revolving said blades whereby when a cut of meat is moved by the conveyors from the inlet to the outlet of the frame, the cut of meat will be simultaneously slashed through its upper and lower surfaces by said blades.

2. Apparatus for slashing cuts of meat containing bones, such as hams, shoulders and the like, prior to the removal of the bones from the cuts, comprising:
   a frame having an inlet and an outlet;
   conveyor means on said frame for supporting and moving cuts of meat from said inlet to said outlet, said conveyor means including a plurality of endless conveyor elements arranged in horizontal side-by-side relation and defining a continuous horizontal support surface, the cuts of meat being horizontally supported on and moved by a plurality of the conveyor elements when moved from the inlet to the outlet;
   an upper blade assembly including a plurality of similar revolvable circular blades, means mounting each upper blade on the frame for swinging movement independently of the other upper blades;
   a lower blade assembly including a plurality of similar revolvable circular lower blades, means mounting each lower blade on the frame for vertical movement independently of the other lower blades, each lower blade having an edge portion projecting between a pair of upper blades in overlapping relation therewith;
   power means, means for drivingly connecting said upper and lower blades with said power means for revolving said blades whereby when a cut of meat is moved by the conveyors from the inlet to the outlet of the frame, the cut of meat will be simultaneously slashed through its upper and lower surfaces by said blades.

3. The apparatus as defined in claim 2 wherein said upper blade assembly includes a plurality of elongate arms, means mounting each arm for vertical movement relative to the other arms, means revolvably mounting each of said upper blades on one of said arms, and said drive means connecting each upper blade with said power means.

4. The apparatus as defined in claim 2 wherein said lower blade assembly includes a plurality of elongate arms, means mounting each arm for vertical movement relative to the other arms, means revolvably mounting each of said lower blades on one of said arms, and said drive means connecting each lower blade with said power means.

5. The apparatus as defined in claim 1 wherein each blade of said lower blade assembly projects upwardly between a pair of adjacent conveyor elements.

6. The apparatus as defined in claim 3 wherein said drive means connecting said upper blades with said power means includes a plurality of driven pulleys each being connected with one of said upper blades, a plurality of drive pulleys connected with said power means, and a plurality of belts each being trained about one of said driven pulleys and one of said drive pulleys.

7. The apparatus as defined in claim 2 and means yieldably resisting swinging movement of the blades of said upper and lower blade assemblies.

8. The apparatus as defined in claim 1 and pneumatic means engaging said blade mounting means for each blade of the upper blade and lower blade assemblies, said pneumatic means permitting rapid cushioned movement of a blade when the latter encounters a bone in the meat being slashed.

9. The apparatus as defined in claim 8 wherein said pneumatic means includes an elongate frame member extending transversely of said frame and having a hollow interior defining a pair of separate air chambers connected to a source of air under pressure, a first group of pneumatic cylinder and piston units engaging the mounting means for the blades of the upper blade assembly and being connected in communicating relation with one of said chambers, a second group of cylinder and piston units engaging the mounting means for the blades of the lower blade assembly and being connected in communicating relation with the other of said chambers.

10. The apparatus as defined in claim 1 wherein said drive means for said upper and lower blade assemblies includes a plurality of driven pulleys each being connected with one of said blades, a plurality of drive pulleys, a plurality of endless belts each engaging one of said drive pulleys and one of said driven pulleys, each driven pulley being adjustable relative to the associated drive pulley to vary the tension on the associated belt.

11. The apparatus as defined in claim 1 and an upper blade assembly support structure normally positioned within said frame and having all of said upper blades and upper blade mounting means connected therewith, said upper blade support structure being shiftable relative to said frame for shifting the upper blade assembly exteriorly of the confines of said frame to permit cleaning or repair of said upper blade assembly.

12. The apparatus as defined in claim 1 and a lower blade assembly support structure normally positioned within said frame and having all of said lower blades and lower blade mounting means connected therewith, said upper blade support structure being shiftable relative to said frame for shifting the lower blade assembly exteriorly of said frame for cleaning and repair of said lower blade assembly.

13. The apparatus as defined in claim 11 wherein said upper blade assembly is vertically shifted to a position exteriorly of said frame.

14. The apparatus as defined in claim 12 wherein said lower frame assembly is shifted laterally to a position exteriorly of said frame.

15. The apparatus as defined in claim 1 wherein said blade mounting means for each blade of the upper blade assembly comprises an elongate arm, each arm having a hold-down shoe integral therewith and projecting therefrom in the direction of travel of the meat being slashed to exert a downward force on the meat during the cutting operation.

16. The apparatus as defined in claim 15 wherein said upper blade assembly comprises a support structure, an elongate shaft mounted on said support structure, each of said arms of the upper blade assembly being independently pivotally mounted on said shaft for pivoting movement relative thereto.

17. The apparatus as defined in claim 1 wherein said lower blade assembly includes a support structure, an elongate shaft mounted on said support structure, said blade mounting means for each blade of the lower blade assembly comprising an elongate arm, each arm being pivotally mounted on said shaft for movement relative thereto and independently of the other arms of said lower blade assembly.

18. The apparatus as defined in claim 1 wherein said endless conveyor elements comprise a plurality of sets of endless conveyor belts, the belts of each set being of a different length than the belts of another set, the belts of said sets being horizontally arranged and cooperating with each other so that the respective upper runs thereof present a substantially horizontal conveying surface.

* * * * *